(No Model.)
W. H. FULLER.
FINDER FOR PHOTOGRAPHIC CAMERAS.
No. 369,515. Patented Sept. 6, 1887.
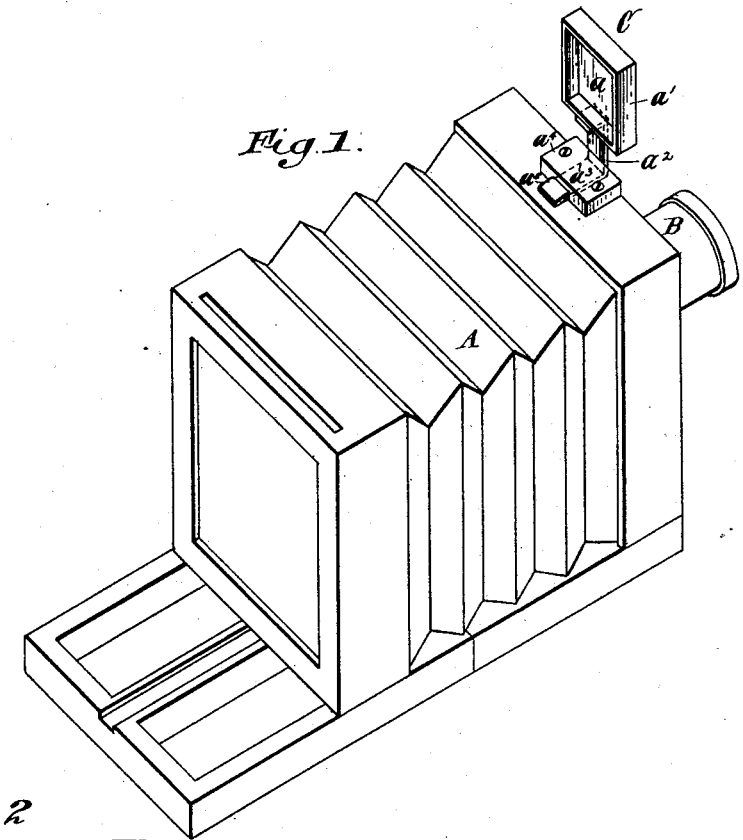
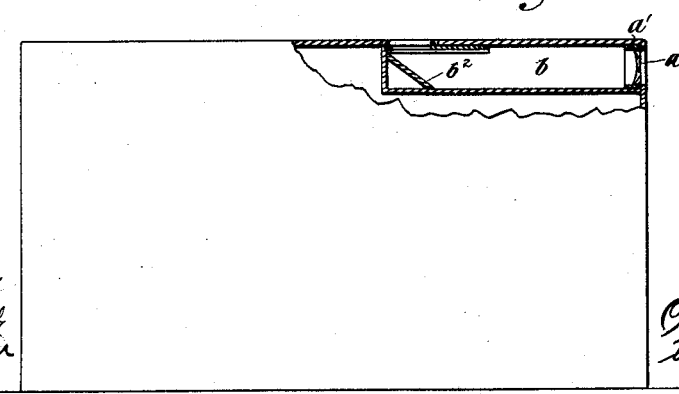
Witnesses
James Griswold
John Dillon
Inventor
Willard H. Fuller
by his attorneys
Gifford & Brown

UNITED STATES PATENT OFFICE.

WILLARD H. FULLER, OF PASSAIC, NEW JERSEY, ASSIGNOR TO THE SCOVILL MANUFACTURING COMPANY, OF NEW YORK, N. Y.

FINDER FOR PHOTOGRAPHIC CAMERAS.

SPECIFICATION forming part of Letters Patent No. 369,515, dated September 6, 1887.

Application filed May 23, 1887. Serial No. 239,037. (No model.)

*To all whom it may concern:*

Be it known that I, WILLARD H. FULLER, of Passaic, in the county of Passaic and State of New Jersey, have invented a certain new and useful Improvement in Finders for Photographic Cameras, of which the following is a specification.

My improvement relates to so-called "finders" for photographic cameras, by means of which the object to be photographed is located and brought within the field of the object-lens.

I will describe a finder embodying my improvement, and then point out the novel features in claims.

In the accompanying drawings, Figure 1 is a perspective view of a camera-box having my improved finder arranged thereon. Fig. 2 is a view of the lens of the finder removed from its frame. Fig. 3 is a section thereof, taken at the plane of the line $x\ x$, Fig. 2. Fig. 4 is a side elevation of a camera-box, a portion being broken away to disclose a different arrangement of the finder.

Similar letters of reference designate corresponding parts in all the figures.

Referring first to the example of my improvement illustrated in Fig. 1, A designates a photographic camera. It may be of the usual or any desired construction.

B designates the lens-tube.

C designates the finder. It comprises a lens, $a$, of rectangular outline, and a frame, $a'$, also shown as rectangular. The lens is secured in the frame preferably by suitable adhesive material. The frame is, as here shown, rigidly mounted upon another frame, $a^2$, which frame $a^2$ comprises a tongue, $a^3$, provided with a catch, $a^5$. Secured to a portion of the frame of the camera—by preference, the stationary front frame—is a metal plate, $a^4$. This plate is provided upon its under side with a horizontally-extending groove, through which the tongue $a^3$ may be passed. This tongue is resilient, and when passed through said groove sufficiently far the catch $a^5$ will spring upwardly until it engages the plate $a^4$, thus securing the finder and preventing its accidental displacement.

The finder may be readily removed from the camera by pressing down upon the catch $a^5$ and withdrawing the tongue $a^3$.

It will be observed that the frame $a^2$ elevates the finder somewhat above the camera-frame. By preference, the camera will be directly above the lens-tube.

The finder-lens which I employ is plano-concave, whereby the object or objects received in its field will be seen right-side up, and, owing to the lens being rectangular, it or they will be very clear and distinct. It is intended in practice that the field of the finder-lens shall be the same as that of the object-lens, so that it may be seen at a glance what impression the sensitized plate or paper will receive at an exposure.

In Fig. 4 I have shown my improvement applied to a so-called "detective-camera." This camera and its case may be of the usual or any desired construction, and as the same does not form part of my invention I have only illustrated the case thereof, a portion of which I have broken away to more clearly show my improvement. The finder-lens is in this instance also arranged directly above the lens-tube and inset into a portion of the case. It is at the forward end of a finder tube or passage, $b$, extending rearwardly therefrom. At the rear end of the finder-tube is arranged a mirror, $C^2$, and above the mirror is an opening in the finder-tube provided with a slide, $b'$. The mirror is arranged at such an angle that upon looking down the said opening the image of the object or objects included in the field of the finder-lens will be clearly delineated.

By my improvement the use of ground glass, upon which the image is reflected, and which is usually employed in camera-finders, is wholly avoided, and at the same time, as the image is displayed right-side up and very clear and distinct, its use in every way is advantageous.

What I claim as of my invention, and desire to secure by Letters Patent, is—

1. The combination, with a camera, of a finder therefor, comprising a rectangular plano-concave lens, substantially as specified.

2. The combination, with a camera, of a finder therefor, comprising a rectangular plano-concave lens of approximately the same field as the object-lens, substantially as specified.

3. The combination, with a camera, of a finder therefor, comprising a rectangular plano-concave lens and a frame in which said lens is mounted, said frame being detachably secured to the camera, substantially as specified.

WILLARD H. FULLER.

Witnesses:
JOSEPH BARTON,
H. LITTLEJOHN.